United States Patent [19]

D'Heur et al.

[11] Patent Number: 5,164,267
[45] Date of Patent: Nov. 17, 1992

[54] LAMINATED COMPOSITE

[75] Inventors: Jacques D'Heur, Brussels; Claude Michel, Wavre, both of Belgium; Roland Grobelny, Tavaux, France

[73] Assignee: Solvay & Cie (Societe Anonyme), Brussels, Belgium

[21] Appl. No.: 526,627

[22] Filed: May 22, 1990

[30] Foreign Application Priority Data

May 25, 1989 [FR] France ................................ 89 06895

[51] Int. Cl.$^5$ ...................... B32B 27/08; B32B 23/08; B29C 47/00
[52] U.S. Cl. ............................ 428/474.4; 156/244.11; 427/366; 428/476.3; 428/507; 428/516
[58] Field of Search .................. 428/474.4, 476.3, 507, 428/516; 156/244.11; 427/365, 366

[56] References Cited

FOREIGN PATENT DOCUMENTS 0254531 7/1987 European Pat. Off. .
0288972A2 4/1988 European Pat. Off. .
61-108549 6/1986 Japan .
2040223A 12/1979 United Kingdom .

OTHER PUBLICATIONS

English Translation of Japanese Laid-Open Patent No. 108549/86 to Ishizaki et al., 16 pages, Publ. date of May 1986.
Hensen, Friedhelm, Plastics Extrusion Technology, Ch. 11, pp. 331-340, 1988.

Primary Examiner—Thomas J. Herbert, Jr.
Attorney, Agent, or Firm—Willian Brinks Olds Hofer Gilson & Lione

[57] ABSTRACT

Laminated composite consisting of a substrate sheet coated with a film (A) comprising at least one layer based on a polyamide resulting from the polycondensation of an aliphatic α, ω-dicarboxylic acid with xylylenediamines.

11 Claims, No Drawings

LAMINATED COMPOSITE

The present invention relates to a laminated composite consisting of a substrate sheet coated with a film comprising at least one layer of a semiaromatic polyamide. It also relates to a process for obtaining this laminated composite.

In Japanese Patent Application 84/229,660 published under the number 108,549/86 (Mitsubishi Petrochemical) there was a description of composites obtained by laminating a substrate sheet, which may be paperbased, to a multilayer film manufactured by coextrusion of a layer of polyolefin (low density polyethylene (LDPE)) and of a layer of a polymer exhibiting gas-barrier properties (barrier polymer). This barrier polymer may be an ethylene hydrolysed vinyl acetate (EVOH) copolymer, a polyacrylonitrile, a polyvinylidene chloride or nylon 6. The disadvantage of these barrier polymers lies in their relatively low processing temperatures. They cannot be coextruded with polyolefins, in particular LDPE, at temperatures which are sufficiently high to ensure the adhesiveness of the latter to the substrate sheet. It is known, in fact (see, for example, F. Hensen, Platics Extrusion Technology, Hauser Publishers, 1988, page 335), that this adhesiveness is related to the extrusion temperature of the polyolefin. To overcome this disadvantage it has been proposed to subject the film layer intended to be placed in contact with the substrate sheet to a separate treatment improving its adhesiveness (corona treatment, etc.) or to coat this layer with costly adhesives (abovementioned Japanese patent application; F. Hensen, op. cit., page 333-334).

These complicated operations have not turned out to be completely satisfactory. The adhesives, for example, can migrate through the composites or can decompose at elevated temperature with the formation of malodorous or toxic products.

It has now been found that particular barrier polymers, capable of being processed at higher temperature, make it possible to obtain laminated composites whose constituents adhere well together.

To this end, the present invention relates to laminated composites consisting of a substrate sheet coated with a film (A) comprising at least one layer based on a polyamide (P) resulting from the polycondensation of an aliphatic α,ω-dicarboxylic acid with xylylenediamines.

The laminated composite according to the invention comprises a substrate sheet. The substrate sheet may be based on organic materials and metals. Among the metals, aluminium is preferred. The organic materials may be cellulosic materials such as, for example, paper, cardboard or cellophane, or thermoplastic polymers such as, for example, polypropylene, aliphatic polyamides and polyethylene terephthalate. The substrate sheets based on a thermoplastic polymer may be obtained by the conventional methods for processing thermoplastic polymers and employed as such or after biaxial orientation of the said sheets.

The substrate sheet itself may consist of a laminated sheet comprising a layer based on a thermoplastic polymer and a metal layer, such as, for example, sheets of thermoplastic polymers metallized, for example, by deposition of a metal such as aluminium, or comprising a layer of a cellulosic material and at least one layer based on a thermoplastic polymer such as, for example, paper/polyethylene, and polyethylene/paper/polyethylene laminate sheets.

The laminated composite according to the invention also comprises a film (A) combined by laminating with the substrate sheet. The film (A) comprises at least one layer based on a polyamide (P) resulting from the polycondensation of an aliphatic α,ω-dicarboxylic acid with xylylenediamines.

The polyamides (P) from which the products of the n are manufactured are synthesized in a known manner by a reaction of polycondensation of xylylenediamine containing more than 60 mol% and preferably more than 90 mol% of the meta isomer of this diamine (the remainder, if any, consisting of the para isomer) and of an aliphatic α,ω-dicarboxylic acid. This acid is generally an acid with a linear chain, containing from 6 to 12 carbon atoms, which can be represented by the formula $HOOC(CH_2)_nCOOH$ in which $4 \leq n \leq 10$. Examples of acids which can be employed are adipic, suberic, sebacic, undecanedioic and dodecanedioic acids. Adipic acid is preferred. The preferred polyamide within the scope of the present invention is obtained by reaction of condensation of m-xylylenediamine with adipic acid (called PAMXD6 hereinafter). The choice of this polyamide as barrier polymer makes it possible to obtain films (A) at processing temperatures of between 250° and 320° C. and laminated composites whose constituents adhere well together.

The film (A) may also comprise at least one layer (C) based on modified polyolefin. This material, coextrudable at high temperature with the polyamide (P), improves the moisture resistance of the latter and avoids water absorption thereby. Furthermore, it reinforces the adhesiveness between the substrate sheet, the polyamide (P) and possible other layers which may form part of the film (A) (see below). This reinforcement of the adhesiveness is therefore obtained directly and more simply than with the coatings of adhesive latices as practised according to the prior art.

Modified polyolefin is intended to denote polyolefins which comprise units derived from polar monomers, in addition to monomeric units derived from alpha-olefins. Alpha-olefin is intended to denote terminally unsaturated olefins whose molecule contains from 2 to 8 carbon atoms, in particular ethylene, propylene and n-butene, most especially ethylene. The polar monomer may be any organic compound containing at least one unsaturated bond, preferably of olefinic type, and at least one carboxylic group, optionally in the form of anhydride. Monomers containing from 3 to 12 carbon atoms in their molecule are preferably employed. These polar monomers may be especially unsaturated monocarboxylic acids such as acrylic, methacrylic or chloroacrylic acids, or unsaturated polycarboxylic acids such as maleic, fumaric and itaconic acids, or, furthermore, the anhydrides derived from these acids, such as maleic anhydride. The preferred polar monomers are acrylic and methacrylic acids and maleic anhydride.

The modified polyolefins may be obtained by grafting polyolefins by means of a polar monomer or by copolymerization of alpha-olefins with polar monomers. Among the modified polyolefins obtained by grafting polyolefins by means of a polar monomer there may be mentioned polyolefins grafted by means of maleic anhydride, such as polyethylenes or polypropylenes grafted with maleic anhydride (for example the products marketed under the name Admer by Mitsui petrochemical Industries).

Among the copolymers of alpha-olefins with polar monomers which can be employed according to the invention there may be mentioned copolymers of ethylene with polar monomers such as ethylene acrylic acid copolymers, ethylene - methacrylic acid copolymers, ethylene - maleic anhydride copolymers, ethylene - acrylic acid - maleic anhydride terpolymers and also ionomers, that is to say polymers containing ionic bonds between the polymer chains, such as, for example, the metal (Na, Zn) salts of ethylene - (meth)acrylic acid copolymers. Among the abovementioned copolymers, ionomers and ethylene - acrylic acid - maleic anhydride are preferred. The mixture of these modified polyolefins with unmodified polyolefins of identical or different kind does not depart from the scope of the invention.

When the film (A) comprises a layer of polyamide (P) and at least one layer (C), the successive order of the layers may be such that it gives rise to structures: SCP, SPC and SCPC, where S denotes the substrate sheet;
P the polyamide layer (P);
C the layer(s) (C).

In addition to the layer of polyamide (P) and the optional layer(s) (C), the film (A) may additionally comprise at least one layer (D) based on a thermoplastic polymer whose processing temperature is compatible with that of the polyamide (P) and of the optional modified polyolefin of the layer(s) (C). By way, of thermoplastic polymers which can be employed to produce the layer (D) there may be mentioned polyesters, such as polyethylene terephthalate and polybutene terephthalate, aliphatic polyamides, such as nylon 66, and polyolefins, such as polyethylene and polypropylene.

Among all these thermoplastic polymers, the polyolefins are preferred. They are generally of the same kind as those defined in connection with the layer (C). Particularly preferred polyolefins are ethylene polymers and, among these, low density polyethylene (LDPE). In fact, these polyolefins and the polyamide (P), in particular LDPE, on the one hand, and PAMXD6, on the other hand, can both be coextruded in the high temperature ranges (250° to approximately 300° C.) which are beneficial for the adhesiveness of the layer (D) of the film (A) to the substrate sheet when it is laminated with the latter.

These adhesiveness properties can be improved further by mixing the polyolefin intended to form the layer (D) with 20 to 50% by weight, preferably 30 to 45% by weight of one of the modified polyolefins described in connection with the layer (C) above. Among the modified polyolefins which can be employed for this purpose ionomers are preferred.

The layer (D) introduces an additional barrier against moisture and water absorption of the film (A) and, in its preferred embodiments, can also contribute the organoleptic characteristics required from the film (A) by the food industry. The various following structures are possible in the case of the film (A) when it comprises a layer of polyamide (P), at least one layer (C) and at least one layer (D): SDCP, SDCPC, SDCPCD, SPCD and SCPCD, where S denotes the substrate sheet;
P the polyamide layer (P);
C the layer(s) (C);
D the layer(s) (D).

The presence of a number of alternating and successive layers of each of the materials defined above comes within the scope of the invention, just as the presence of layers consisting of polymeric scrap originating from the recycling of these materials.

The film (A) may be produced by any technique for processing thermoplastic polymers. In the case where the film (A) is a single-layer film, the usual techniques of extrusion through a flat die can be resorted to. The extrusion temperature of the polyamide (P) is generally between 250° and 320° C. In the case where the film (A) is a multilayer film, it may be manufactured by any technique of sequential addition of various constituent layers. The method of production which is found to be the most advantageous from an economic standpoint is the well-known technique of coextrusion. In this preferred method of production of the film (A), the usual techniques of coextrusion through a flat or round die, with a feedblock or a multimanifold, can be resorted to. Nevertheless, preference is given to films coextruded through a feedblock die and still more particularly trough a flat feedblock die. The temperature at which the thermoplastic polymers are coextruded through the die varies according to the thermoplastic polymers employed to produce the film (A), and is generally between 250° and 320° C., and preferably between 250° and 290° C. In the case of this preferred method, the choice of PMAXD6 as polyamide (P) and of LDPE as polyolefin for the layer (D) is particularly advantageous, because they make it possible to perform the coextrusion at a temperature (approximately 270°-290° C.) which is sufficiently high for the adhesiveness properties to be optimized, and sufficiently low not to cause an untimely degradation of the layer (D).

The thickness of the constituent layers of the film (A) and the total thickness of the said film (A) is not critical and obviously depends on the use for which the laminated composite according to the invention is intended. In general, however, in the case of multilayer films (A) it is preferable that the thickness of the polyamide layer (P) be between 2 and 200 $\mu$m and preferably between 5 and 50 $\mu$m, that the thickness of the layer(s) (C) be between 2 and 25 $\mu$m and that the thicknesses of the various layers of the film (A) are adjusted so that the total thickness of the film (A) may be between 10 and 500 $\mu$m, and preferably between 10 and 150 $\mu$m.

After extrusion or coextrusion of the film (A), the said film (A) is assembled with the substrate sheet and this assembly of the film (A) and of the substrate sheet also constitutes an aspect of the invention in the case where the substrate sheet is based on cellulosic material and where the film (A) comprises at least one layer (P) of PAMXD6 and one layer (D) of LDPE. According to this aspect, the substrate sheet is brought up towards at least one pair of rolls. Into the gap formed by the substrate sheet and one roll of the pair there is introduced the film (A) leaving a flat die at a temperature of between 270° and 290° C., that is to say, as explained above, in an optimum temperature region both for the adhesiveness of the final composite and to avoid the degradation of the latter. The film (A) is combined with the substrate sheet driven by the pair of rolls, with the application of pressure. The linear pressure exerted in the gap between the rolls and the temperature contributed by the rolls are maintained so as to obtain the maximum adhesiveness between the film (A) and the substrate sheet without permanent distortions of the film (A) or of the substrate sheet and without blocking occurring when the laminated composite is unwound from the reel. The linear pressure is between 20 and 1000 N/cm and preferably between 50 and 400 N/cm. The temperature of the rolls is between 15° and 60° C.

The laminated composites according to the invention are particularly suitable for packages such as packages for food, pharmaceutical and cosmetological products.

The invention is illustrated by the example of

EXAMPLE

A laminated composite is produced from a film (A) with five layers DCPCD, in which:

P denotes a layer of polyamide PAMXD6 (sold under the tradename Nyref 6001 by Solvay & Cie) 15 μm in thickness;

C denotes a layer of ethylene acrylic acid-maleic anhydride terpolymer (sold under the tradename Lotader 3410 by Orkem) 3.5 μm in thickness;

D denotes a layer based on a mixture containing 60% by weight of a low density polyethylene with a melt index of 4.5, measured according to standard D1238 (product marketed by Neste Oy) and 40% by weight of an ionomer (the product Escor 5110 from Exxon Chemical) 6 μm in thickness.

To manufacture the multilayer structure of the film (A) three extruders are available, feeding a special feedblock, which itself feeds a flat die 189 cm in width. The extruders supply the layers P, C and D of the film (A). The connection block and the flat die are maintained thermally at 280° C. The linear speed of the film (A) after coextrusion is equal to 66 m/min.

The film (A) leaving the flat die at a temperature of 280° C. is then deposited onto a sheet of glossy white paper and combined by passing between a pair of rolls 30 cm in diameter. The two rolls were cooled with water at 20° C.

After cooling to room temperature the adhesiveness (delamination strength) was evaluated on a Frank type 650 tensometer according to a method closely related to ASTM standard D 1876-72. During this test the film (A) was torn before the delamination of the said film from its substrate, which shows that a very good adhesiveness has been obtained.

The measurement of permeability to oxygen, according to ASTM standard D 1434, of the laminated composite gives a value of 19 cm$^3$/m$^2$ d atm, and the permeability to water vapour, measured according to ASTM standard E 96-E is 14 g/m$^2$ d. The laminated composite obtained according to the invention is therefore characterized by a good imperviousness to gases and to water vapour.

We claim:

1. Laminated composite consisting of a substrate sheet based on cellulosic material laminated with a film (A) comprising at least one layer based on a polyamide (P) resulting from the polycondensation of an aliphatic α, ω-dicarboxylic acid with xylylenediamine, said film (A) comprising, in the following order;
   (i) a layer (D) in contact with the substrate sheet, said layer (D) based on a thermoplastic polymer whose processing temperature is compatible with that of the polyamide (P);
   (ii) a layer ()C based on a modified polyolefin which is polyolefin modified by grafting with a polar monomer; and
   (iii) the polyamide layer (P).

2. Laminated composite according to claim 1, characterized in that the aliphatic α, ω-dicarboxylic acid is adipic acid.

3. Laminated composite according to claim 1, characterized in that the polar monomer is an unsaturated carboyxlic acid or the anhydride derived from this acid.

4. Laminated composite according to claim 1, characterized in that the modified polyolefin is an ethylene - acrylic acid - maleic anhydride terpolymer.

5. Laminated composite according to claim 1, characterized in that the thermoplastic polymer comprises low density polyethylene.

6. Laminated composite according to claim 1, characterized in that the film (A) comprises, in this order:
   a layer (D), in contact with the substrate sheet,
   a layer (C),
   a polyamide-based layer (P),
   a layer (C).

7. Laminated composite according to claim 1, characterized in that the film (A) comprises, in this order:
   a layer (D) in contact with the substrate sheet,
   a layer (C),
   a polyamide layer (P),
   a layer (C),
   a layer (D).

8. Laminated composite according to claim 1, characterized in that the film (A) is produced by coextrusion.

9. Process for manufacturing the laminated composite according to any one of claims 1, 2, 3, 4, 5, 6, 7 or 8, characterized in that the film (A) is produced by coextrusion at between approximately 270° and approximately 290° C. and is laminated by calendaring with the substrate sheet based on cellulosic material.

10. Laminated composite consisting of a substrate sheet based on cellulosic material laminated with a film (A) comprising at least one layer based on a polyamide (P) resulting from the polycondensate of an aliphatic α, ω-dicarboxylic acid with xylylenediamine, said film (A) comprising, in the following order;
    (i) a layer (D) in contact with the substrate sheet, said layer (D) based on a thermoplastic polymer whose processing temperature is compatible with that of the polyamide (P);
    (ii) a layer (C) based on a modified polyolefin which comprises polar monomers in addition to monomeric units derived from alpha-olefins; and
    (iii) the polyamide layer (P).

11. Laminated composite consisting of a substrate sheet based on cellulosic material laminated with a film (A) comprising one layer based on a polyamide (P) resulting from the polycondensation of an aliphatic α, ω-dicarboxylic acid with xylylenediamine, said film (A) consisting essentially of, in the following order:
    (i) a layer (D) is contact with substrate sheet, said layer (D) based on a thermoplastic polymer whose processing temperature is compatible with of the polyamide (P);
    (ii) a layer (C) based on a modified polyolefin which comprises polar monomers in addition to monomeric units derived from alpha-olefins; and
    (iii) the polyamide layer (P).

* * * * *

UNITED STATES PATENT AND TRADEMARK OFFICE
CERTIFICATE OF CORRECTION

PATENT NO. : 5,164,267

DATED : November 17, 1992

INVENTOR(S) : D'Heur et al.

It is certified that error appears in the above-identified patent and that said Letters Patent is hereby corrected as shown below:

At claim 1, column 5, line 59, change "OC" to --(C)--.

At claim 10, column 6, line 37, change "polycondensate" to --polycondensation--.

At claim 11, column 6, line 54, "is" should be --in--, and after "with" --the-- should be inserted; line 56, after "with" --that-- should be inserted.

Signed and Sealed this

Fourth Day of January, 1994

*Attest:*

BRUCE LEHMAN

*Attesting Officer*  Commissioner of Patents and Trademarks